US006382704B1

(12) United States Patent
Nastasoiu

(10) Patent No.: US 6,382,704 B1
(45) Date of Patent: May 7, 2002

(54) ADJUSTABLE HINGE ASSEMBLY

(75) Inventor: Ion Nastasoiu, Rochester Hills, MI (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 09/828,688

(22) Filed: Apr. 9, 2001

(51) Int. Cl.[7] .................................................. B60J 10/08

(52) U.S. Cl. ............... 296/146.11; 296/76; 296/107.08; 16/298; 16/364

(58) Field of Search .............................. 296/146.11, 76; 49/381, 386; 16/245, 224, 235; 280/728.3, 728.2

(56) References Cited

U.S. PATENT DOCUMENTS

| | | | | | |
|---|---|---|---|---|---|
| 3,643,755 | A | * | 2/1972 | Gionet et al. | 296/76 |
| 3,747,271 | A | * | 7/1973 | Adamski | 296/76 |
| 4,580,315 | A | * | 4/1986 | Beckwith | 16/289 |
| 4,776,626 | A | * | 10/1988 | Seyler | 16/289 |
| 4,893,863 | A | * | 1/1990 | Skonieczny et al. | 296/76 |
| 5,074,609 | A | * | 12/1991 | Dear | 296/76 |
| 5,195,215 | A | * | 3/1993 | Kiefer | 296/76 |
| 5,235,725 | A | * | 8/1993 | Rees | 16/298 |
| 5,243,738 | A | * | 9/1993 | Kiefer | 16/298 |
| 5,365,639 | A | * | 11/1994 | Lewkoski | 296/76 |
| 5,398,379 | A | * | 3/1995 | Kiefer | 16/364 |
| 5,419,012 | A | * | 5/1995 | Lewis | 296/76 |
| 5,584,099 | A | * | 12/1996 | Westerdale | 296/76 |
| 5,873,619 | A | * | 2/1999 | Lewkoski et al. | 16/241 |
| 5,967,586 | A | * | 10/1999 | Duffy et al. | 16/235 |
| 6,070,929 | A | * | 6/2000 | Barkley | 16/75 |
| 6,193,300 | B1 | * | 2/2001 | Nakatomi et al. | 296/107.08 |
| 6,254,165 | B1 | * | 7/2001 | Neubrand | 296/107.08 |
| 2001/0030441 | A1 | * | 10/2001 | Wilde et al. | 296/76 |
| 2001/0054257 | A1 | * | 12/2001 | Wygle et al. | 296/106 |

FOREIGN PATENT DOCUMENTS

| | | | |
|---|---|---|---|
| EP | 0281483 | * | 3/1988 |

* cited by examiner

*Primary Examiner*—Ken Patel
(74) *Attorney, Agent, or Firm*—Laura C. Bargitt

(57) ABSTRACT

An adjustable hinge assembly for swingably attaching a closure panel over a trunk space of an automotive vehicle. The hinge assembly includes a hinge strap which has a first end portion and a second end portion, wherein the first end portion is adjustably attached to two brackets that are attached to the trunk lid and the second end is rotatably attached to the vehicle body using a ball and socket joint. The brackets include rounded surfaces that are rotated and translated relative to attachment surfaces of the hinge strap, and the brackets operate in conjunction with the ball and socket joint to allow the trunk lid to be precisely fit over the trunk space opening.

7 Claims, 8 Drawing Sheets

ADJUSTABLE HINGE ASSEMBLY

TECHNICAL FIELD

The invention relates to a hinge assembly for precision mounting a rear closure panel to a body of a vehicle.

BACKGROUND OF THE INVENTION

It is known that automotive vehicles typically include a rear closure panel hingedly attached to the body of the vehicle. For aesthetics and to assure proper sealing of the rear closure panel, the rear closure panel requires a precise fit, both as to gap spacing and flushness of the panel relative to adjacent panels. It is known to design rear closure panels having adjustable hinges with adjustability in a single direction, selected from fore-aft, cross-vehicle, or up-down. However, there is a need for an improved hinge assembly that has multiple degrees of freedom for adjustment and which will facilitate assembly and adjustment of rear closure panels on vehicles.

SUMMARY OF THE INVENTION

The invention provides a hinge assembly that adjustably attaches a closure panel to a body of an automotive vehicle. The assembly includes a first bracket having a first rounded surface and a second bracket having a second rounded surface. The first surface is generally orthogonal to the second surface. The first surface includes a first opening, and the second surface includes a second opening. A generally elongated hinge strap extends between a first end portion and a second end portion of the hinge strap wherein the second end is attached to the vehicle using a ball and socket joint. The first end portion includes a first generally flat attachment surface generally orthogonal to a second generally flat attachment surface and the hinge strap is attached to the first and second brackets in a manner which allows the rounded surfaces to be selectively rotated relative to the attachment surfaces.

BRIEF DESCRIPTION OF THE DRAWINGS

FIG. 7(*a*) illustrates a sectional view of a portion of the hinge strap of FIG. 7 taken along line 7A—7A.

DESCRIPTION OF THE PREFERRED EMBODIMENT

Figure 1:
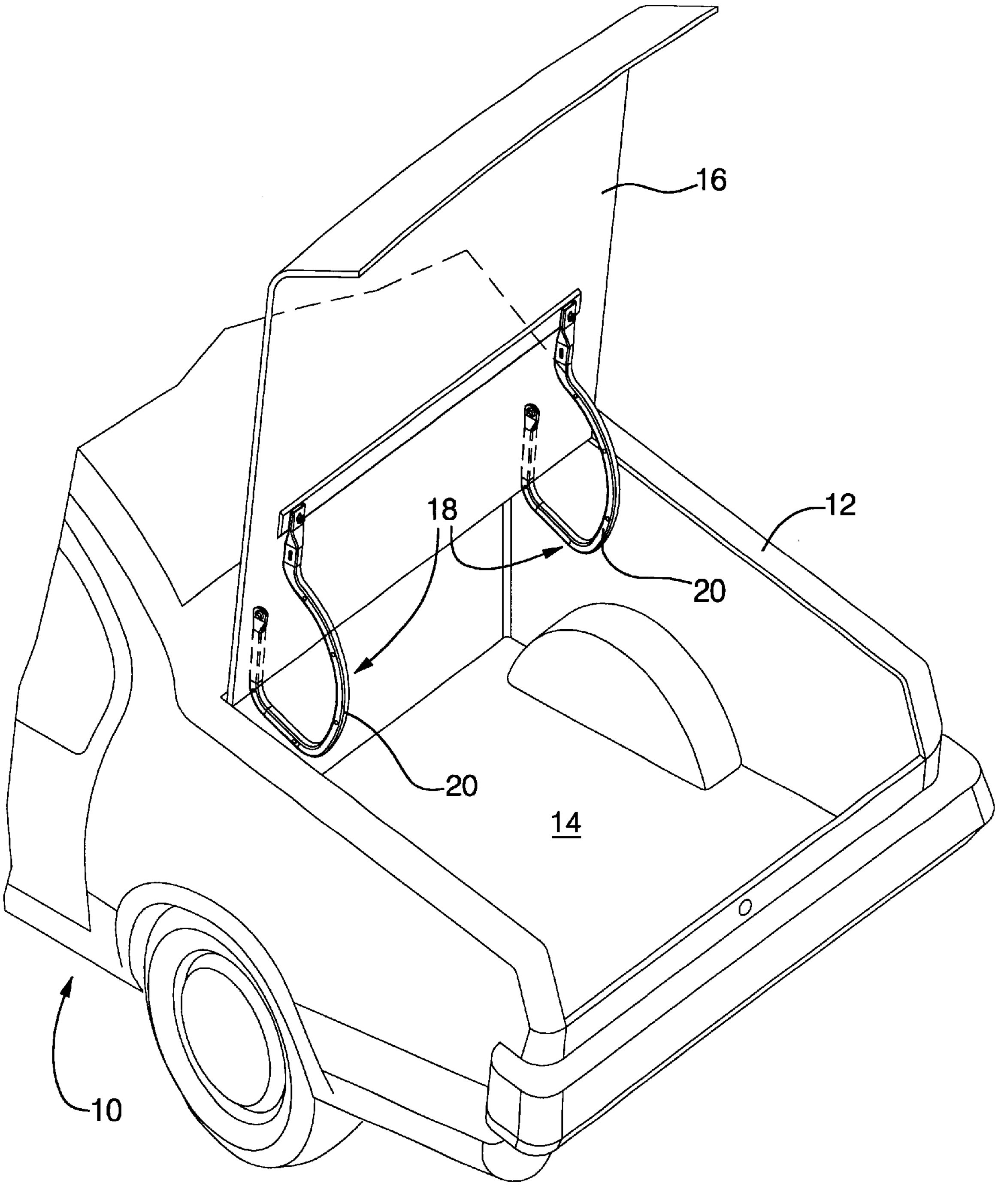
FIG. 1 illustrates an automotive vehicle having a closure panel attached to the vehicle with a pair of hinge assemblies.
Figure 2:
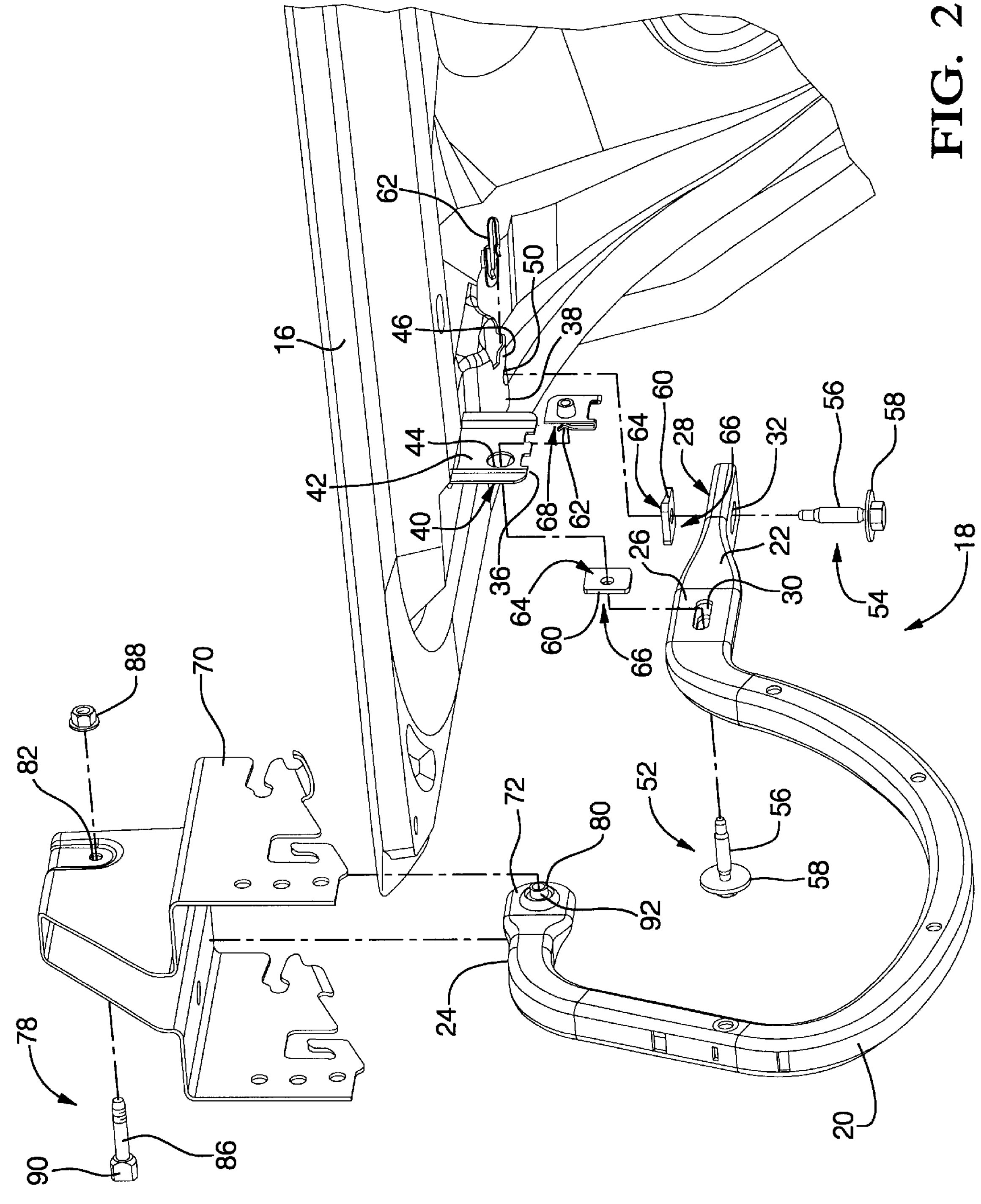
FIG. 2 illustrates an exploded view of a hinge assembly.

Referring now to FIGS. 1 and 2, there is illustrated an automotive vehicle 10 having a body surface 12 defining a rear compartment 14. A closure panel 16 is hingedly connected to the vehicle 10 with a pair of adjustable hinge assemblies 18, for permitting as many as six degrees of adjustability freedom.

As shown in FIGS. 1, 2, 3, 6, 7 and 7(*a*), each hinge assembly 18 includes a "gooseneck" shaped hinge strap 20 having a first end portion 22 for connecting to the closure panel 16 and a second end portion 24 for connecting to the vehicle body 12.

The first end portion 22 includes a first generally flat attachment surface 26 and a second generally flat attachment surface 28 orthogonally disposed and spaced relative to the first attachment surface 26. The first and second attachment surfaces 26, 28 respectively, include a first slot 30 and a second slot 32 elongated generally in the fore-aft direction of the vehicle 10. The transverse planes of the respective slots 30, 32 are generally orthogonal to each other.

The closure panel 16 is welded to a metal insert 34 (see FIG. 6) having a first mounting bracket 36 and a second mounting bracket 38 for attaching the first and second attachment surfaces 26, 28 of the hinge strap 20 to the closure panel 16. As seen best in FIGS. 2–4, the first and second brackets 36, 38 are generally "U"-shaped. The first bracket 36 includes a first convex rounded surface 40 opposing a first concave rounded surface 42 and a first oversized aperture 44 extending through the surfaces 40, 42. The second bracket 38 includes a second convex rounded surface 46 opposing a second concave rounded surface 48 with a second oversized aperture 50 extending through the surfaces 46, 48.

As seen FIG. 2, the attachment surfaces 26, 28 of the hinge strap 20 are attached to the first and second brackets 36, 38 with fastening assemblies 52, 54. Each of the fastening assemblies 52, 54 includes a bolt 56, a washer 58, a spacer 60, and a J-nut 62.

The strap 20 is attached to the brackets 36, 38 by aligning the oversized apertures 44, 50 of the bracket 36, 38 with the slots 30, 32 of the hinge strap 20. Thereafter, the bolts 56 are respectively placed within the aligned slot 30, 32 and aperture 44, 50 combinations, such that the bolts 56 of the fastener assemblies 52, 54, in order, extend through the washers 58, the slots 30, 32, the spacers 60, the apertures 44, 50 and lastly into the j-nuts 62 into which the bolts 56 are threadably fastened. The spacers 60 are specifically designed with concave rounded surfaces 64, which, upon fastening, mate and/or correspond to the convex rounded surfaces 40, 46 of the brackets 36, 38. The spacers 60 also include planar surfaces 66 which are designed to abuttingly contact the attachment surfaces 26, 28 of the hinge strap 20. Furthermore, each of the J-nuts 62 includes a convex rounded surface 68 that mates with or corresponds to first and second concave surfaces 42, 48 of the brackets 36, 38.

Figure 7:
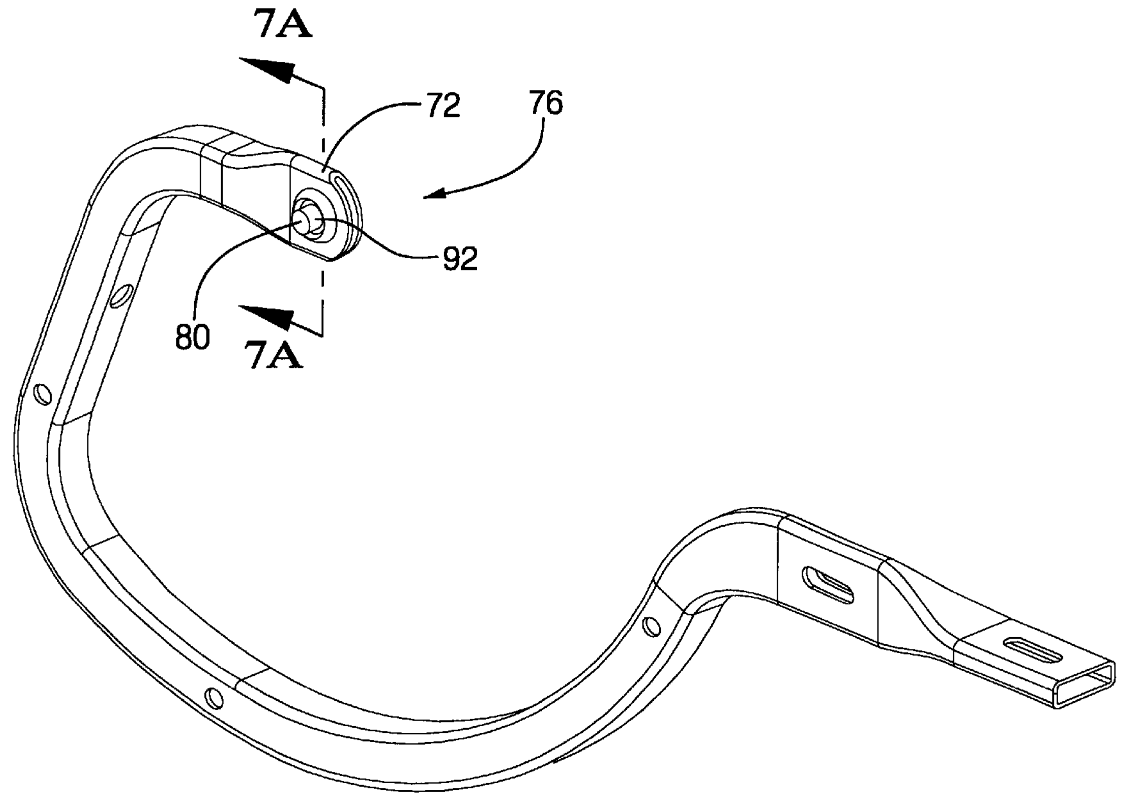
FIG. 7 illustrates a perspective view of a hinge strap.
Figure 7A:
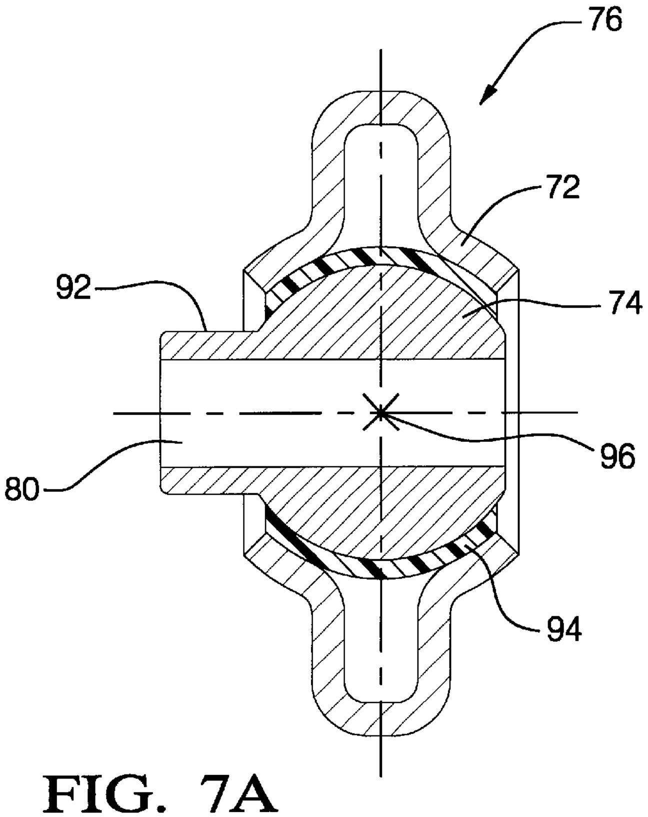

Referring to FIGS. 1, 2, 7 and 7(*a*), a hinge box 70 is attached to the vehicle on an inner wall of the rear compartment 14. As seen in FIG. 7(*a*), for instance, the second end portion 24 of the hinge strap 20 includes a socket portion 72 surrounding a ball portion 74 of a ball and socket joint 76. The joint 76 is attached to the hinge box 70 with a fastener assembly 78, shown in FIG. 2. Thus, to attach the box 70 to the strap 20, a hole 80 of the ball portion 74 of the ball and socket joint 76 is aligned with holes 82, 84 of the hinge box 70 and a formed bolt 86 is inserted through the holes 80, 82, 84. Thereafter, a nut 88 is threadably fastened to the bolt 86 such that a non-cylindrical portion 90 of the bolt 86 is matingly received in the non-circular hole 84 of the hinge box 70, thereby securing the bolt 86 against rotation and fixing the ball portion 74 and a flange 92 of the ball portion 74 relative to the hinge box 70. This allows the socket portion 72 and an anti-friction bearing 94 along with the hinge strap 20 to rotate at least partially in all directions about a pivot point 96 so that the closure panel 16 is rotatably attached to the vehicle 10. Preferably, the bearing 94 is formed from an anti-friction material such as Polytetrafluoroethylene (PTFE) TEFLON®, available from E. I. duPont de Nemours & Co. located at Wilmington, Del. 19898, (302) 999.4592.

Figure 3:
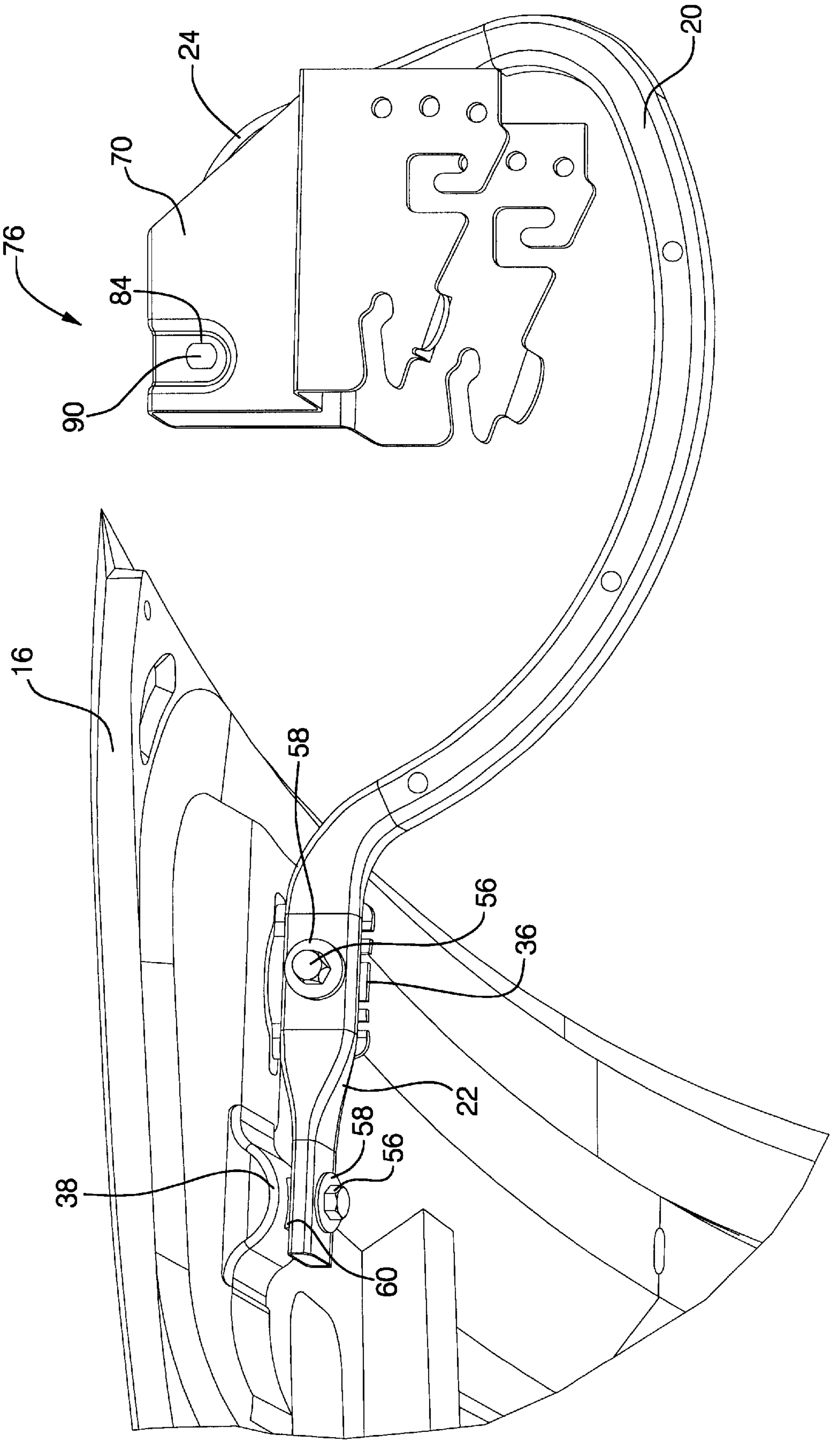
FIG. 3 illustrates a perspective view of the hinge assembly of FIG. 2 assembled to a closure panel.
Figure 4:
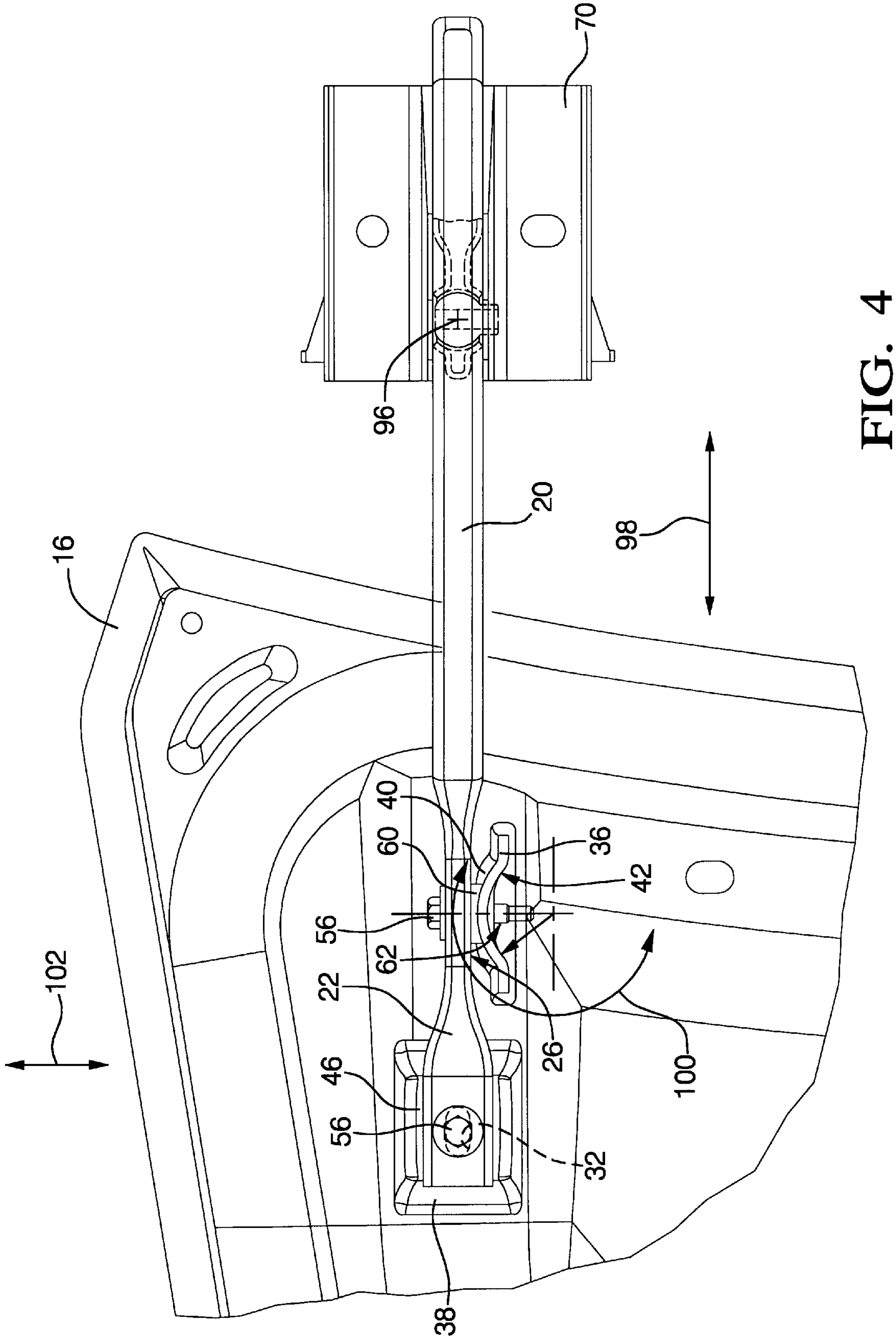
FIG. 4 illustrates a bottom view of the hinge assembly of FIG. 2.
Figure 5:
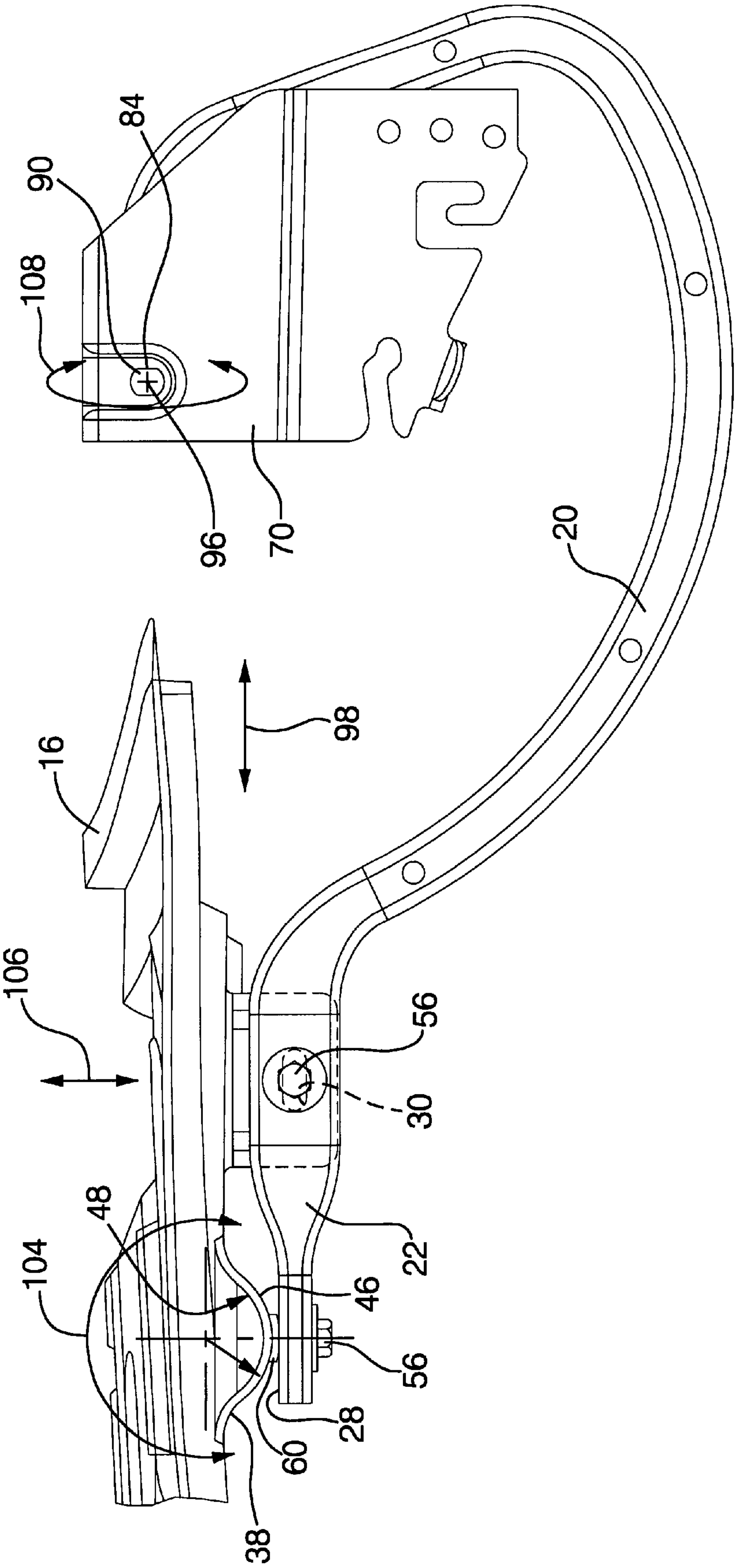
FIG. 5 illustrates a side view of the hinge assembly of FIG. 2.
Figure 6:
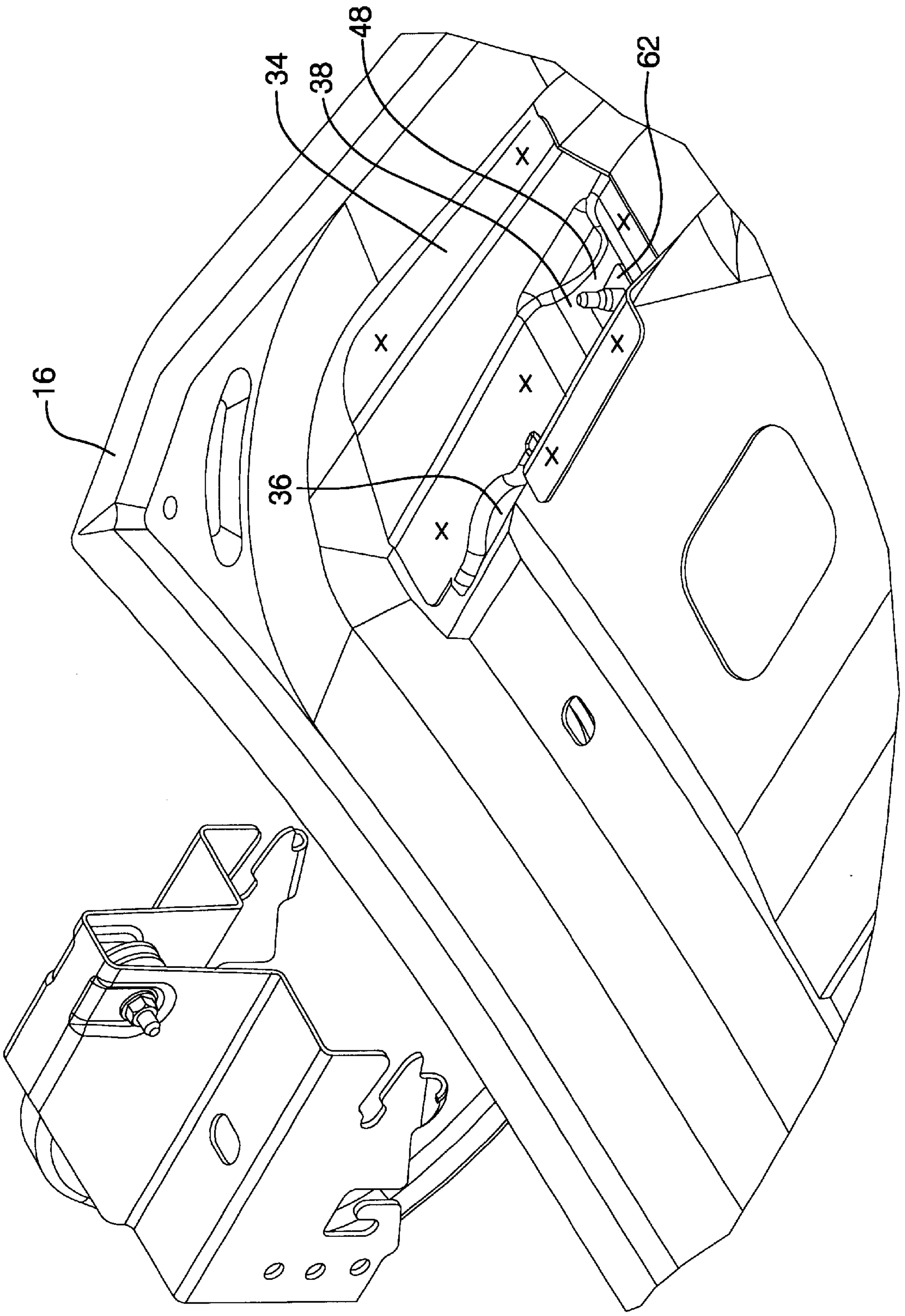
FIG. 6 illustrates another perspective view of the hinge assembly of FIG. 2.

Turning now to FIGS. 3, 4 and 5, the brackets 36, 38 and the ball and socket joint 76 allow the panel 16 to be adjusted in a variety of ways to more precisely fit the panel 16 over the compartment 14. For purposes of the following discussion and to gain a full understanding of the operation of the invention, the hinge box 70, the pivot point 96 and the vehicle 10 are considered stationary. Furthermore, the fastening assemblies 52, 54 are in a generally "loosened" state during the following described movements.

First, the closure panel 16 may be adjusted to experience "fore-aft translation" 98 as indicated by double headed arrow 98 in FIG. 4 and 5. Fore-aft translation 98 is achieved by moving the closure panel 16 toward or away from the hinge box 70 such that the fastening assemblies 52, 54 move along the elongation of the slots 30, 32.

Second, the closure panel 16 may be adjusted to experience "cross-vehicle rotation" 100 as indicated by double-headed arrow 100 in FIG. 4. Cross-vehicle rotation 100 is achieved by rotating the closure panel 16 such that the rounded surface 40 of the bracket 36 is rotated relative to the attachment surface 26 of the hinge strap 20.

Third, the closure panel 16 may be adjusted to experience "cross-vehicle translation" 102 as indicated by double-headed arrow 102 in FIG. 4. Cross-vehicle translation 102 is achieved by combining fore-aft translation 98 with cross-vehicle rotation 100. In other words, cross-vehicle translation 102 is achieved by rotating the rounded surface 40 relative to attachment surface 26 and simultaneously moving the fastening assemblies 52, 54 along the elongation of slots 30, 32. As the movement and rotation of cross vehicle translation 102 occurs, the ball and socket joint 76 allow the hinge strap 20 to rotate about the pivot point 96 in a direction generally opposite the rotation of the panel 16 about the rounded surface 40 of the bracket 36 in order to counter the rotation of the panel 16 thereby completing and producing a pure translation of the panel 16 rather than a translation and a rotation.

Fourth, the closure panel 16 may be adjusted to experience "up/down rotation" 104 as indicated by double-headed arrow 104 in FIG. 5. Up/down rotation 104 is achieved by rotating the closure panel 16 such that the rounded surface 46 of the bracket 38 is rotated relative to the attachment surface 28 of the hinge strap 20.

Fifth, the closure panel 16 may be adjusted to experience "up/down translation" 106 as indicated by double-headed arrow 106 in FIG. 5. Up/down translation 106 is achieved by combining fore-aft translation 98 with up/down rotation 104. In other words, up/down translation 106 is achieved by rotating the rounded surface 46 relative to the attachment surface 28 while simultaneously moving the fastening assemblies 52, 54 along the elongation of the slots 30, 32 of the hinge strap 20. As the movement and rotation of up/down translation 106 occurs, the ball and socket joint 76 may allow the hinge strap 20 to rotate about the pivot point 96 in a direction generally opposite the rotation of the panel 16 about the rounded surface 46 of the bracket 38 in order to counter the rotation of the closure panel 16 thereby producing and completing a pure translation of the panel 16 rather than a translation and a rotation.

Sixth, the closure panel 16 may be adjusted to experience "hinge strap rotation" 108 as indicated by double-headed arrow 108 in FIG. 5. Hinge strap rotation 108 is achieved by rotating the closure panel 16 together with the hinge strap 20 around the pivot point 96 of the ball and socket joint 76. In this particular adjustment, there is no relative motion between the hinge strap 20 and the brackets 36, 38.

Figure 8:
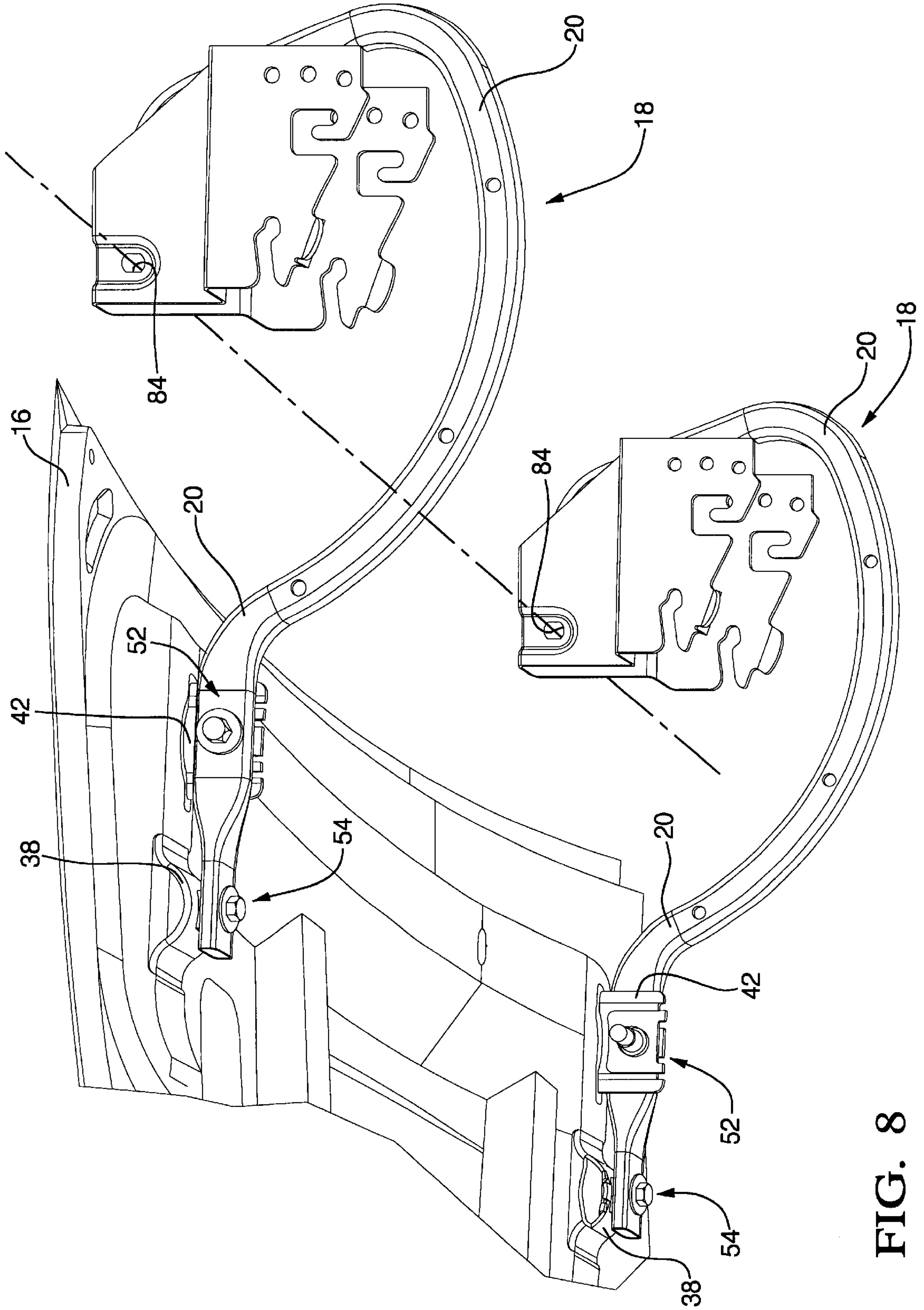
FIG. 8 illustrates a pair of hinge assemblies attached to the closure panel of a vehicle.

Advantageously, the fastening assemblies 52, 54 of both hinge assemblies 18 in FIG. 8 are adjustable and thus may be maintained in a fastening but generally loosened state. Any combination of the previously described motions and rotations may be carried out sequentially or simultaneously upon the panel 16 to move the panel 16 in nearly any direction in three-dimensional space to precisely fit the panel 16 over the compartment 14 of the vehicle 10. Thereafter, the fastening assemblies 52, 54 may be tightened while the panel 16 is in proper position (e.g., fitted over the trunk space opening). As the panel 16 is adjusted, the ball and socket joints 76 automatically adjust the direction of rotation of the hinge straps 20 about the pivot points 96 to adjust for smooth opening and closing of the panel 16.

Additionally, it is also possible to substantially tighten one of the fastening assemblies 52, 54 while maintaining the other in a loosened state, thus allowing only up-down or only cross vehicle adjustments while limiting or restricting adjustments in other directions.

The skilled artisan will recognize that hinge assemblies according to the present invention may be used for other closures of an automotive vehicle such as a door, a hood or otherwise.

It should be understood that the invention is not limited to the exact embodiment or construction which has been illustrated and described but that various changes may be made without departing from the spirit and the scope of the invention.

What is claimed is:

1. A hinge assembly that adjustably and rotatably attaches a closure panel to an automotive vehicle, said assembly comprising:

a first bracket for attaching to said closure panel, said first bracket including a first rounded surface;

a second bracket for attaching to said closure panel, said second bracket including a second rounded surface disposed substantially orthogonal to said first rounded surface;

a generally elongated hinge strap having a first end portion and a second end portion, said second end portion adapted for rotatably attaching to said vehicle using a ball and socket joint and said first end portion having a first flat attachment surface and a second flat attachment surface disposed orthogonally relative to said first flat attachment surface, said first end portion attached to both of said first and second brackets such that said first and second rounded surfaces can be selectively rotated relative to said first and second attachment surfaces.

2. A hinge assembly as in claim 1, wherein said ball and socket joint includes a polytetrafluoroethylene bearing for assisting in the rotation of said hinge strap.

3. A hinge assembly as in claim 1, further comprising a hinge box, wherein said ball and socket joint are rotatably attached to said hinge box.

4. A hinge assembly for adjustably attaching a closure panel of an automotive vehicle to a body of said vehicle for precisely fitting said closure panel over a compartment within said vehicle, said assembly comprising:

a) a metal insert welded to said closure panel, said insert including i) a first bracket for attaching to said closure panel, said first bracket having a first rounded surface and a first opening extending through said rounded surface;

ii) a second bracket for attaching to said closure panel, said second bracket having a second rounded surface and a second opening, said second bracket generally extending substantially orthogonal to said first bracket; and b) a hinge strap having a first end portion and a second end portion, said first end portion including a first flat attachment surface having an elongated slot and a second flat attachment surface having a second elongated slot, said first attachment surface generally orthogonal to said second attachment surface, said first attachment surface attached to said first bracket with a first fastening assembly extending through said first enlarged opening and said first slot, said second attachment surface attached to said second bracket with a second fastening assembly extending through said second enlarged opening and said second slot, said first rounded surface being selectively rotatable relative to said first attachment surface, said second rounded surface being selectively rotatable relative to said second attachment surface, said second end portion including a socket portion rotatably attached to a ball portion that is secured relative to a hinge box, said hinge box being attached to said vehicle.

5. A hinge assembly as in claim 4, wherein said ball and socket joint includes a polytetrafluoroethylene bearing to assist in the rotation of said hinge strap.

6. A hinge assembly as in claim 4, wherein each of said fastening assemblies includes a spacer with a concave surface for contacting said first and second rounded surfaces and a generally flat surface for contacting said first and second attachment surfaces.

7. A hinge assembly for adjustably attaching a closure panel of an automotive vehicle to a body of said vehicle for precisely fitting said closure panel over a compartment within said vehicle, said assembly comprising:

a) a metal insert welded to said closure panel, said insert including i) a first bracket for attaching to said closure panel, said first bracket having a first rounded surface and a first enlarged opening extending through said rounded surface;

ii) a second bracket for attaching to said closure panel, said second bracket having a second rounded surface and a second enlarged opening, said second bracket generally extending substantially orthogonal to said first bracket; and b) a hinge strap having a first end portion and a second end portion, said first end portion including a first flat attachment surface having an elongated slot and a second flat attachment surface having a second elongated slot, said first attachment surface generally orthogonal to said second attachment surface, said first attachment surface attached to said first bracket with a first adjustable fastening assembly extending through said first enlarged opening and said first slot, said second attachment surface attached to said second bracket with a second adjustable fastening assembly extending through said second enlarged opening and said second slot, said first rounded surface being selectively rotatable relative to said first attachment surface, said second rounded surface being selectively rotatable relative to said second attachment surface, said second end portion including a socket portion rotatably attached to a ball portion that is secured relative to a hinge box, said hinge box attached to said vehicle;

wherein prior to tightening said first and second adjustable assemblies for securing said closure panel in its final position, said hinge assembly permits fore-aft translation, cross-vehicle rotation, cross-vehicle translation, up/down rotation, and up/down translation of said closure panel.

* * * * *